United States Patent [19]
Goodwin et al.

[11] Patent Number: 6,119,371
[45] Date of Patent: Sep. 19, 2000

[54] RESILIENT BLADDER FOR USE IN FOOTWEAR

[75] Inventors: David A. Goodwin, Portland, Oreg.; Richard M. Hogan, Chesterfield, Mo.; Steven D. Buchanan, Sr., Hillsboro; Edward Nathaniel Thomas, Portland, both of Oreg.; Gary Allen Kokstis, Vancouver, Wash.

[73] Assignee: Nike, Inc., Beaverton, Oreg.

[21] Appl. No.: 09/348,201

[22] Filed: Jul. 8, 1999

Related U.S. Application Data

[62] Division of application No. 09/004,908, Jan. 9, 1998, Pat. No. 5,993,585.

[51] Int. Cl.$^7$ .................................................. A43B 13/20
[52] U.S. Cl. ................................. 36/29; 36/28; 428/69; 428/71
[58] Field of Search ........................... 36/29, 28; 428/68, 428/71, 76, 69

[56] References Cited

U.S. PATENT DOCUMENTS

| | | |
|---|---|---|
| 1,241,142 | 9/1917 | O'Hara . |
| 1,759,976 | 5/1930 | Cummings . |
| 2,502,101 | 3/1950 | Morgan et al. . |
| 2,671,277 | 3/1954 | Montgomery . |
| 2,743,510 | 5/1956 | Mauney et al. . |
| 2,997,100 | 8/1961 | Morris . |
| 3,008,213 | 11/1961 | Foster et al. . |
| 3,044,075 | 7/1962 | Rawlings . |
| 3,170,178 | 2/1965 | Scholl . |
| 3,205,106 | 9/1965 | Cross . |
| 3,432,609 | 3/1969 | Duvall et al. . |
| 3,505,758 | 4/1970 | Willisford . |
| 3,507,727 | 4/1970 | Marshack . |
| 3,555,709 | 1/1971 | Raffaelli, Sr. . |
| 3,616,126 | 10/1971 | Tungseth . |
| 3,675,377 | 7/1972 | Suter . |
| 3,914,881 | 10/1975 | Striegel . |
| 4,025,684 | 5/1977 | Neidhardt . |
| 4,062,131 | 12/1977 | Hsiung . |
| 4,073,072 | 2/1978 | Gross et al. . |
| 4,104,425 | 8/1978 | Hirmann . |
| 4,149,919 | 4/1979 | Lea et al. . |
| 4,217,705 | 8/1980 | Donzis . |
| 4,228,600 | 10/1980 | Krug et al. . |

(List continued on next page.)

FOREIGN PATENT DOCUMENTS

| | | |
|---|---|---|
| 2 731 381-A1 | 3/1995 | France . |
| 917173 | 7/1954 | Germany . |
| 2 027 227 | 6/1970 | Germany . |
| 2148401 | 4/1973 | Germany . |
| 2460034 | 6/1976 | Germany . |
| 2855268 | 7/1980 | Germany . |
| 2901084 | 7/1980 | Germany . |
| 385060 | 12/1932 | United Kingdom . |
| 389848 | 3/1933 | United Kingdom . |
| 598960 | 3/1948 | United Kingdom . |
| 1411121 | 10/1975 | United Kingdom . |
| WO 89/02363 | 3/1989 | WIPO . |
| WO 89/11047 | 11/1989 | WIPO . |
| WO 93/12685 | 8/1993 | WIPO . |

OTHER PUBLICATIONS

Patent Cooperation Treaty Written Opinion, International App. No. PCT/US98/27927, dated Dec. 3, 1999.
International Search Report for International Application No. PCT/US98/27927.

*Primary Examiner*—Ted Kavanaugh
*Attorney, Agent, or Firm*—Banner & Witcoff, Ltd.

[57] ABSTRACT

A bladder for use as a cushioning element and footwear incorporating the bladder. The enclosed core is formed of spaced apart first and second fabric layers connected together by a plurality of connecting yarns. The shell is formed of see-through plastic material whereby the connecting yarns are visible through the sidewall. The plurality of connecting yarns preferably are arranged in bands with gaps devoid of connecting yarns between adjacent bands, and the ends of the bands and the gaps are visible through the sidewall.

14 Claims, 10 Drawing Sheets

U.S. PATENT DOCUMENTS

| | | |
|---|---|---|
| 4,229,889 | 10/1980 | Petrosky . |
| 4,247,347 | 1/1981 | Lischer et al. . |
| 4,247,348 | 1/1981 | Lischer . |
| 4,261,776 | 4/1981 | Lea et al. . |
| 4,264,386 | 4/1981 | Sears, Jr. et al. . |
| 4,319,412 | 3/1982 | Muller et al. . |
| 4,347,205 | 8/1982 | Stewart . |
| 4,370,754 | 2/1983 | Donzis . |
| 4,403,858 | 9/1983 | Dantowitz . |
| 4,409,271 | 10/1983 | Pehr . |
| 4,441,211 | 4/1984 | Donzis . |
| 4,451,721 | 5/1984 | Nemeskeri . |
| 4,453,271 | 6/1984 | Donzis . |
| 4,462,331 | 7/1984 | McCrory . |
| 4,464,850 | 8/1984 | Ebert et al. . |
| 4,486,901 | 12/1984 | Donzis . |
| 4,512,037 | 4/1985 | Vacanti . |
| 4,513,449 | 4/1985 | Donzis . |
| 4,519,856 | 5/1985 | Lazzara . |
| 4,590,689 | 5/1986 | Rosenberg . |
| 4,656,760 | 4/1987 | Tonkel et al. . |
| 4,676,032 | 6/1987 | Jutras . |
| 4,680,876 | 7/1987 | Peng . |
| 4,754,511 | 7/1988 | Sargent . |
| 4,785,558 | 11/1988 | Shiomura . |
| 4,805,319 | 2/1989 | Tonkel . |
| 4,813,161 | 3/1989 | Lesley . |
| 4,817,304 | 4/1989 | Parker et al. . |
| 4,846,917 | 7/1989 | Hartel et al. . |
| 4,863,771 | 9/1989 | Freeman . |
| 4,864,738 | 9/1989 | Horovitz . |
| 4,874,640 | 10/1989 | Donzis . |
| 4,906,502 | 3/1990 | Rudy . |
| 4,914,836 | 4/1990 | Horovitz . |
| 4,936,029 | 6/1990 | Rudy . |
| 4,985,931 | 1/1991 | Wingo, Jr. . |
| 4,999,072 | 3/1991 | Dischler . |
| 5,036,603 | 8/1991 | Dischler . |
| 5,042,176 | 8/1991 | Rudy . |
| 5,058,330 | 10/1991 | Chow . |
| 5,083,361 | 1/1992 | Rudy . |
| 5,152,018 | 10/1992 | Lea . |
| 5,220,737 | 6/1993 | Edington . |
| 5,235,715 | 8/1993 | Donzis . |
| 5,238,231 | 8/1993 | Huang . |
| 5,317,983 | 6/1994 | Strifors et al. . |
| 5,343,639 | 9/1994 | Kilgore et al. . |
| 5,353,523 | 10/1994 | Kilgore et al. . |
| 5,406,719 | 4/1995 | Potter . |
| 5,572,804 | 11/1996 | Skaja et al. . |
| 5,575,088 | 11/1996 | Allen et al. . |
| 5,638,612 | 6/1997 | Donzis . |
| 5,741,568 | 4/1998 | Rudy . |

RESILIENT BLADDER FOR USE IN FOOTWEAR

This application is a divisional of Ser. No. 09/004,908 filed on Jan. 9, 1998, now U.S. Pat. No. 5,993,585.

TECHNICAL FIELD

The present invention is directed to a resilient bladder for use in footwear, in particular for use as a portion of the sole of the footwear. The bladder is formed of an outer enclosing member and an inner member, with the outer enclosing member preferably formed of sheets of plastic material, one of which is formed into a shell configuration, and with the inner member formed of spaced apart first and second layers connected together by a plurality of connecting members. The invention is also directed to a method for forming the bladder.

BACKGROUND OF THE INVENTION

Footwear is divided into two general parts, an upper and a sole. The upper is designed to snugly and comfortably enclose the foot. The other major portion of a shoe is the sole. The sole must provide traction, protection, and a durable wear surface. The considerable forces generated in athletics require that the sole of footwear provide enhanced protection and shock absorption for the foot and leg. It is also desirable to have enhanced protection and shock absorption for he foot and leg in all types of footwear. Accordingly, the sole of athletic footwear typically includes several layers, including a resilient, shock absorbent material as a midsole and a ground contacting outer sole or outsole, which provides both durability and traction.

Such midsoles have been made of conventional foam materials, for example, ethylene vinyl acetate (EVA) or polyurethane which compress resiliently under an applied load and dampen to provide cushioning. The outsoles have been made of conventional wear-resistant materials such as a carbon-black rubber compound. Conventional foam materials are resiliently compressible, in part, due to the inclusion in the foam of open or closed cells defining an inner volume that is substantially displaced by gas. That is, the foam can include bubbles formed in the material which include air therein. However, after repeated compression, foam materials deteriorate, in particular, by compaction. The cell structure collapses, resulting in decreased compressibility of the foam. Thus, the overall cushioning of the midsole deteriorates.

One way to overcome the drawbacks of using conventional foam materials is disclosed in U.S. Pat. No. 4,183,156 (patented Jan. 15, 1980 to Marion F. Rudy), incorporated by reference, in which cushioning is provided by inflatable inserts made of elastomeric materials. The inserts include a plurality of tubular chambers which extend substantially longitudinally throughout the length of the footwear. The chambers are in fluid communication with each other at the forefoot and jointly extend across the width of the footwear. In U.S. Pat. No. 4,219,945 (patented Sep. 2, 1980 to Marion F. Rudy), incorporated by reference, an inflated insert is encapsulated in a foam material. The combination of the insert and the encapsulating material functions as the midsole. An upper is cemented to the upper surface of the encapsulating material and an outsole or tread member may be fixed to the lower surface.

U.S. Pat. No. 4,817,304 (patented Apr. 4, 1989 to Mark G. Parker, et al.), incorporated by reference, discloses a foam encapsulated gas-filled insert in which gaps are left along the sides of the encapsulating member. When the midsole is compressed, the insert expands into the gaps. Thus, the gaps provide decreased stiffness in compression of the midsole, while reducing the overall weight of the footwear. Further, by appropriately locating the gaps, the overall impact response characteristics can be tuned along areas of the footwear.

Such bladders generally are made of an elastomeric material and are formed so as to have an upper or lower surface enclosing one or more chambers therebetween. The chambers are pressurized above ambient pressure by insertion of a nozzle or needle connected to a fluid pressure source into a fill inlet formed in the bladder. After the chambers are pressurized, the fill inlet is sealed, for example, by welding, and the nozzle is removed.

Bladders of this type have been manufactured by the prior art two-film technique in which two separate sheets of elastomeric film are formed having the overall peripheral shape of the bladder. The sheets are welded together along the periphery to form a bladder having upper, lower and side surfaces, and at predetermined interior areas to give the bladder a preferred configuration, that is, to have chambers of a predetermined shape and size at desired locations.

Bladders have also been manufactured by the prior art blow-molding technique. A liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold to form a bladder having the preferred shape and configuration.

Another type of prior art bladder used in soles of footwear is disclosed in U.S. Pat. No. 4,906,502 (patented Mar. 6, 1990), and U.S. Pat. No. 5,083,361 (patented Jan. 28, 1992), both issued to Marion F. Rudy, and both hereby incorporated by reference. The bladders disclosed in the '502 and '361 patents are formed as a gas pressurized and inflated structure which comprises an hermetically sealed outer covering barrier layer which is securely bonded substantially over the entire outer surfaces of a double walled interior fabric structure. The double walled fabric structure comprises first and second outer fabric layers which are normally spaced apart from one another at a predetermined distance. Connecting or drop yarns, preferably in the form of multifilament yarns comprised of many individual fibers, extend internally between the proximal or facing surfaces of the respective fabric layers. The filaments of the drop yarns form tensile restraining means and are anchored to the respective fabric layers. The preferred method of manufacturing the double walled fabric structure is double needle bar Raschel knitting.

SUMMARY OF THE INVENTION

The present invention is directed to a method for forming a resilient bladder structure. The method comprises the steps of forming a shell from a flexible material to have a floor and a perimeter sidewall extending from the floor to define an opening to the shell; placing a core, having spaced apart outer surfaces connected together by a plurality of connecting members, into the shell within the area bounded by the sidewalls; enclosing the shell and core with a covering sheet sized to extend to at least the perimeter sidewall of the shell and cover the perimeter sidewall and the core placed in the shell; bonding the floor of the shell to one outer surface of the core and the covering sheet to the other outer surface of the core by applying pressure and heat to the shell-core-covering sheet assembly to compress the core during the bonding step; preventing bonding of the sidewall to the covering sheet during the compression of the core; and bonding the covering sheet to an outer edge of the perimeter sidewall of the shell to form a sealed bladder structure; and placing fluid into the interior of the bladder so that the plurality of connecting members are placed under tension.

A preferred embodiment of the method comprises the steps of thermoforming a shell from a sheet of plastic material by drawing the sheet to a mold to form a shape having a floor, a perimeter sidewall with a draft angle portion to locate an outer perimeter edge of the sidewall outward of the floor of the shell, and a rim having a flat region extending from the outer perimeter edge of the sidewall; placing a core, having spaced apart outer fabric layers connected together by plurality of connecting yarns, into the shell within the area bounded by the sidewalls; enclosing the shell and core with a covering sheet of a plastic material, the covering sheet being sized to extend to at least the flat region and cover the perimeter sidewall and the core placed in the shell; bonding the floor of the shell to one fabric layer of the core and the covering sheet to the other fabric layer by: i) applying RF energy with a lamination die to the shell-core-covering sheet assembly; ii) compressing the core with the lamination die to apply pressure between the shell-core interface and the covering sheet-core interface; and iii) rolling the sidewall of the shell in on itself during the compression of the core with the lamination die to prevent lamination of the sidewall to the covering sheet during the bonding step; welding the covering sheet to the outer edge of the sidewall by applying RF energy with a seal die; and placing fluid into the interior of the bladder so that the plurality of connecting yarns are placed under tension.

In another preferred aspect of the method, the bonding step includes heating and applying pressure to the perimeter edge of the shell-core covering sheet assembly outward of the perimeter of the core to ensure application of sufficient energy along the perimeter of the core to form essentially complete bonds between the shell and the core and the covering sheet and the core along the perimeter of the core by extending the perimeter edge of the lamination die outward of the perimeter of the core; and the step of rolling the sidewall of the shell includes applying pressure with the perimeter edge of the lamination die sufficiently inward of the outer perimeter edge of the sidewall to prevent the lamination die from buckling the sidewall during the compression of the core.

The thermoforming step preferably includes forming the draft angle sufficiently shallow to prevent the sidewall from flattening during compression of the core to thereby assure rolling in of the sidewall.

The preferred method also includes the step of cooling the shell after it is thermoformed in a manner sufficient to shrink the shell and bend the perimeter sidewall inwardly during shrinkage; and the thermoforming step includes forming the draft angle sufficiently large to position the outer perimeter edge of the shell at an aligned location with the seal die after the sidewall of the shell bends inwardly due to shrinkage of the shell after thermoforming.

Another aspect of the invention is directed to a method of forming a bladder from first and second sheets of plastic material wherein a tear seal is formed around the bladder. The method includes the steps of forming a perimeter seal between the first and second sheets of plastic material to define a sealed chamber and forming the tear line as a line of thinned out material pressed into the material by the angled edge of the welding die, by applying pressure, at periodically increasing pressure levels, with a welding die having an angled edge along the area of the perimeter seal being formed and applying RF energy, at a periodically increasing energy levels, to melt and connect the first and second sheets of plastic material adjacent to, and on either side of, the angled edge of the welding die; and forming at least one connection between the first and second sheets of plastic material within the area of the sealed chamber.

The present invention is also directed to a bladder for use as a cushioning element. The bladder includes an outer enclosing member and an inner member. The outer enclosing member is formed of first and second sheets of plastic material. The first sheet of plastic material is formed into a shell shape with a floor and a perimeter sidewall extending away from the floor to an outer perimeter edge. The second sheet of plastic material is formed substantially flat and is connected to the outer perimeter edge of the perimeter sidewall of the first sheet of plastic material to define a sealed chamber. The inner member is formed of spaced apart first and second fabric layers connected together by a plurality of connecting yarns or drop threads. The first sheet is formed of see-through plastic material whereby the connecting yarns are visible through the sidewall.

In a preferred embodiment, the plurality of connecting yarns preferably are arranged in bands with gaps devoid of connecting yarns between adjacent bands, and the ends of the bands and the gaps are visible through the sidewall. The fabric material preferably is a double needle bar Raschel knit fabric with the gaps formed by omitting predetermined needles in the knitting process. The sealed chamber preferably contains a pressurized fluid which places the plurality of connecting yarns under tension.

Another aspect of the invention is directed to a bladder for use as a cushioning element wherein a sealed chamber is formed of a plastic material, the chamber having spaced apart first and second major surfaces. A double walled fabric material is received inside of the sealed chamber. The fabric material has spaced apart first and second fabric layers and a plurality of connecting yarns connected between the fabric layers. The connecting yarns are formed in bands with gaps defining void areas devoid of connecting yarns to enhance the compressibility of the fabric material. The first and second fabric layers respectively are attached to the first and second major surfaces of the sealed chamber; and the sealed chamber contains pressurized fluid to place the plurality of connecting yarns under tension. The fabric material preferably is a double needle bar Raschel knit fabric with the gaps formed by omitting predetermined needles in the knitting process.

The present invention is also directed to footwear incorporating either of the above-described bladders into at least a portion of the sole of the footwear.

Figure 1:
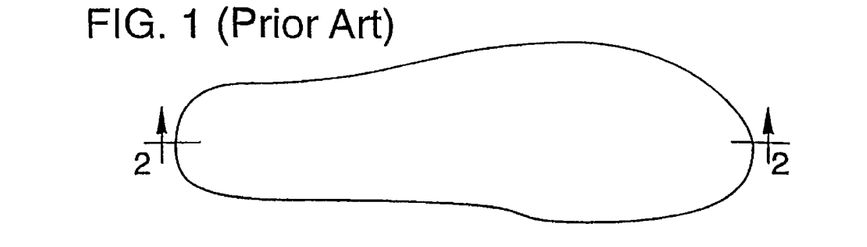
FIG. 1 is a top plan view of a prior art resilient bladder insert for footwear.
Figure 2:
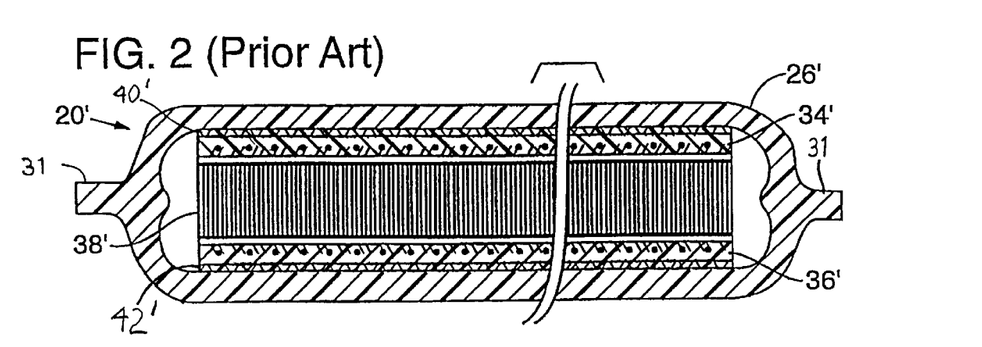
FIG. 2 is a cross-sectional view taken generally along line 2—2 of FIG. 1.

Footwear with bladders of the type disclosed in the '502 and '361 patents have been sold by NIKE, Inc. In this footwear, the peripheral edge seam is located in the middle of the side of the bladder, as illustrated in FIG. 2 herein. The fabric used in these bladders has connecting yarns located uniformly throughout the extent of the fabric. The bladder of the present invention, wherein a shell and covering sheet form the outer member of the bladder, offers a number of advantages over these commercial bladders. For example, locating the seam away from the midpoint of the side of the bladder, locates the seam away from the area of maximum flexing of the sidewall of the bladder. Without an edge seam, at the sidewall, the inflated areas of the bladder can be located further out to the edges of the footwear. Also, without a seam at the sidewall of the bladder, the connecting yarns within the interior of the bladder can be made visible by using a see-through material for the shell. The embodiment of bladder in accordance with the invention that incorporates gaps between groups of connecting yarns, has enhanced cushioning properties over the commercial bladders. By forming the gaps between groups of connecting yarns, space is provided for the connecting yarns to move into when the bladder is compressed. With this additional space, the overall amount that the bladder can compress increases, thus, increasing the working range of the bladder, or the maximum deflection of the bladder before bottoming out. This results in greater capacity to absorb and return energy, and less initial stiffness.

Unique and novel processing techniques were developed in accordance with the present invention in order to manufacture the bladder with the shell configuration.

BRIEF DESCRIPTION OF THE DRAWINGS

The above description and other objects, advantages, and features of the present invention will be more fully understood and appreciated by reference to the specifications and accompanying drawings, wherein.

DETAILED DESCRIPTION OF THE INVENTION

Figure 3:
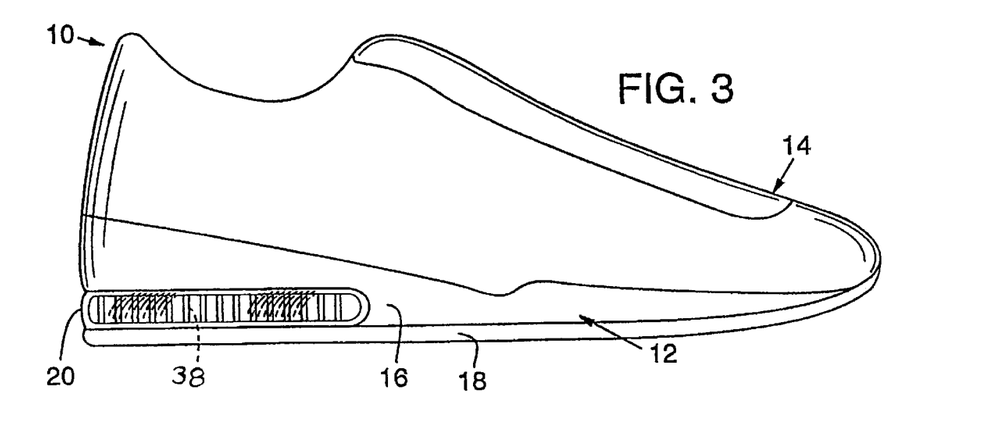
FIG. 3 is a side view of an article of footwear in accordance with the present invention.

Referring to the drawings, wherein like numerals indicate like elements, there is illustrated in FIG. 3 an article of footwear in accordance with the present invention, such as a running shoe, generally indicated as a 10. Shoe 10 includes a sole structure 12 and an upper 14 attached to the sole structure in a conventional manner. Sole structure 12 incorporates novel features of the present invention while upper 14 can be of any conventional design which adapts it to the particular use of the article of footwear. For example, if the article of footwear is a sandal, upper 14 would be comprised of the straps securing the sandal to the foot of a wearer. If the article of footwear were an in-line skate, the upper could be made of rigid plastic or a combination of a non-rigid material and a rigid support structure. Sole structure 12 includes a cushioning or force absorbing midsole 16 and a flexible, wear-resistant outsole 18. Of course, where appropriate, the midsole and outsole portions can be formed as a single integral unit.

A resilient bladder 20, in accordance with the present invention, is secured in the heel area of midsole 16, directly above outsole 18. Bladder 20 is secured in position within the midsole in any conventional manner, such as by adhesive attachment into a recess, or by encapsulation within a foam material in a manner such as disclosed in the '945 Rudy patent referred to above. Details of the method for making bladder 20 are illustrated in FIGS. 4 through 9, with the assembled bladder illustrated in FIGS. 9C and 9D.

Bladder 20 is formed of an outer enclosing member 22 and an inner member 24. Outer enclosing member is formed of a first sheet of plastic material 26 and a second sheet of plastic material 28. The first and second sheets of plastic material preferably are made of the same thermoplastic material, preferably a urethane material such as a blend of thermoplastic aromatic polyurethanes which forms sheet material that is thermoformable RF weldable and resistant to environmental stress cracking in the use as a bladder. A blend of the following thermoplastic polyurethanes manufactured by DOW can be used: 20% 2355-95AEH; 25% 2355-85ATP; and 55% 2355-87AE. FIGS. 9C and 9D illustrate the first and second sheets integrally formed together, by a process in accordance with the present invention, which will be described in detail hereinafter. First sheet 26 is a generally flat covering sheet, and second sheet 28 is formed into the configuration of a shell 29 having a floor 30 and a sidewall 32. At least sheet 28 is preferably formed of a see-through plastic material, so that inner member 24 is visible through sidewall 32. The see-through plastic material thus could be transparent, translucent, clear, or colored; as long as the inner member is visible through sidewall 32. Sheet 26 can also be formed of a see-through plastic material. FIG. 3 is a side view of a shoe 10 wherein connecting members, such as connecting yarns 38, of inner member 24 are visible through the transparent sidewall 32. Other preferred materials for the sheets 26 and 28 are polyurethane materials such as polyester or polyether based polyurethane elastomers, or polyester elastomer. Other preferred elastomer materials for sheets 26 and 28 are noted in the above Rudy patents, which have been incorporated herein by reference.

Inner member 24 is preferably formed from a double-walled fabric material, of the type disclosed in the Rudy '361 and '502 patents, with the changes noted hereinafter. The double-walled fabric is preferably formed of a double needle bar Raschel knit material which has a first fabric layer 34 and a second fabric layer 36 connected to one another by connecting yarns 38. Fabric layers 34 and 36 are preferably formed of air-bulked or otherwise texturized yarn, such as false twist texturized yarn, particularly a combination of Nylon 6, 6 and Nylon 6. Similarly, connecting yarns 38 are preferably formed of air-bulked or texturized yarns, such as false twist texturized yarn, particularly Nylon 6, 6.

First and second layers of a coupling material 40, 42, are respectively attached to first and second fabric layers 34, 36. As described in detail in the '361 Rudy patent, the use of texturized yarn in fabric layers 34, 36, and the use of coupling materials 40, 42, assist in forming a strong bond to the first and second sheets of plastic material 26, 28. The coupling material 40, 42 is preferably the same type of thermoplastic material as the sheets of plastic material 26, 28 forming the outer enclosing member 22, and is applied to the fabric layers 34, 36 in such as manner that the coupling material 40, 42 penetrates a portion of each fabric layer, without penetrating through to the connecting yarns 38. For example, a thermoplastic polyurethane (TPU) manufactured by Deerfield under product number PS-8010 can be used. Coupling material 40, 42 is preferably applied in sheet form to fabric layers 34, 36 by moving the sheets of coupling material and the fabric layers between upper and lower heated platens of a hot press. This method and other preferred methods of applying the coupling material to the fabric layers are discussed in detail in the '361 Rudy patent.

FIG. 2 illustrates a prior art bladder as disclosed in the '361 Rudy patent, with like primed numerals indicating similar elements to the bladder 20 of the present invention. As seen in FIG. 2, first and second sheets of plastic material 26' and 28' are joined together along a seam 31, which is located midway between the outer major surfaces of the sheets 26' and 28'. As disclosed in the '361 patent, bladder 20' is made from two flat sheets of material 26' and 28' which are first laminated to spaced fabric layers 34' and 36', respectively. Coupling material 40', 42' assists in forming the bond between fabric layers 34', 36' and plastic sheets 26' and 28'. Seam 31 is thereafter formed by welding about the perimeter of the two flat sheets. Also, as seen in FIG. 2, connecting yarns 38' extend completely along the length of bladder 20'. Similarly, connecting yarns 38' extend completely across the width of bladder 20'. Bladder 20' is illustrated in an inflated condition, wherein a gas under pressure has been sealed within bladder 20' to place connecting yarns 38' under tension.

Referring to FIG. 9D, the differences between bladder 20 and bladder 20' are readily apparent. Bladder 20 forms the plastic sheet material 28 into shell configuration 29 so that the connection point between the first and second sheets of material is located adjacent to one of the fabric layers, rather than at the midpoint of the thickness of bladder 20. Thus, connecting yarns 38 are readily visible through sidewall 32. Moving the connection seam from the midpoint of the bladder to an upper or lower edge of the bladder forms a differently shaped accumulator volume 35, which allows the core size to be maximized within the bladder. With the core size maximized, thicker bladders are possible by extending the core closer to the edge. The edge seam welding process is also simplified by moving the connection seam from the midpoint of the bladder, since a single tool can be used for bladders of varying thickness. Without an edge seam 30, bladder 20 can be located further out to the edges of the footwear, providing an increased area under the foot that is cushioned by the bladder. Also, moving the seam away from the midpoint of the bladder, moves the seam away from an area of maximum flexing of the wall of the bladder.

The plurality of connecting yarns 38 are arranged in bands 44 separated by gaps 46 which are areas devoid of any connecting yarns. The use of gaps 46 enhances the compressibility of the double-walled fabric over double-walled fabrics which utilize continuous connecting yarns. Bands 44 also present a striking visual appearance when viewed through sidewall 32. FIG. 9C illustrates a cross-section of bladder 20 prior to inflation with a fluid under pressure. In such a state, connecting yarns 38 are not under tension and gaps 46 are not visible; however, for purpose of illustration, small gaps 46 are shown. Gaps 46 are formed during the double needle bar Raschel knitting process by omitting knitting connecting yarns on certain predetermined needles in the warp (wale) direction. Knitting with three needles in and three needles out produces a preferred fabric with bands 44 and gaps 46. Other knitting patterns of needles in and needles out can be used, such as two in and two out, four in and two out, two in and four out, three in and three out, or any combination thereof. Also, gaps can be formed in both a longitudinal and transverse direction, to create a checkerboard pattern of connecting members 38 by, in addition to omitting needles in the warp direction, selectively knitting or not knitting on consecutive courses. In FIG. 9D, bladder 20 is illustrated containing a fluid, preferably a gas under pressure. Preferred gases for pressurizing bladder 20 are hexafluorethane (e.g., Freon, F-116) and sulphurhexafluoride. Other suitable gases, as well as the advantages of the use of the preferred gases and preferred plastic materials for the outer enclosing member are discussed in the aforementioned Rudy patents, in particular the '156 and '250 patents.

Figure 4A:
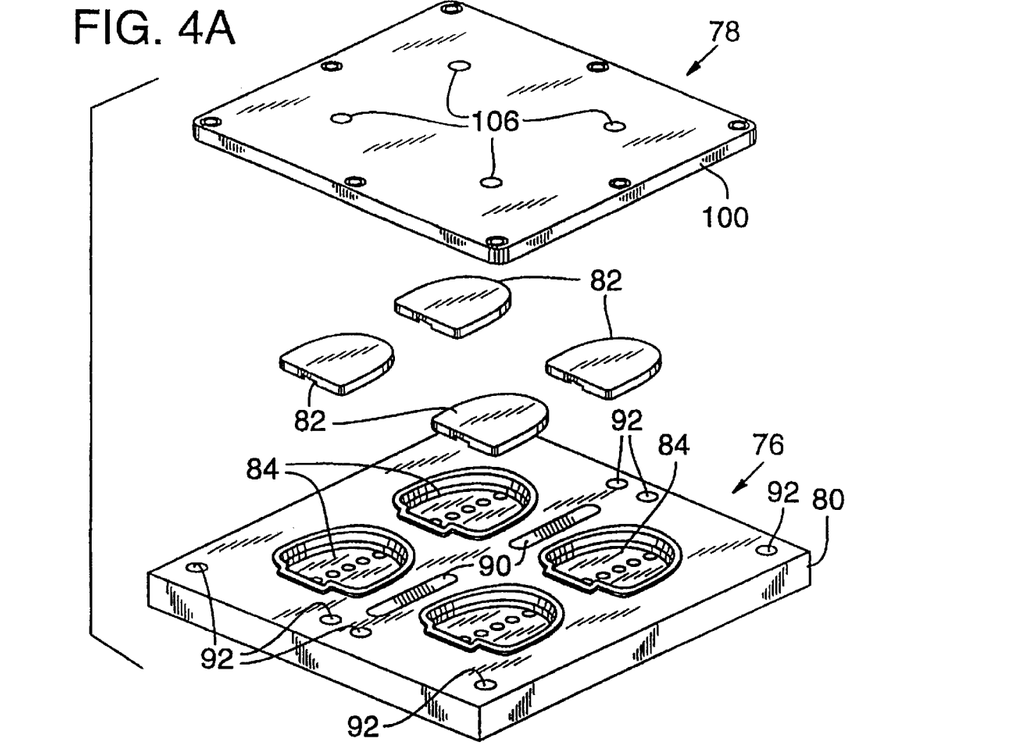
FIG. 4A is an exploded perspective view of the top of portions of a thermoforming apparatus used in the present invention.
Figure 4B:
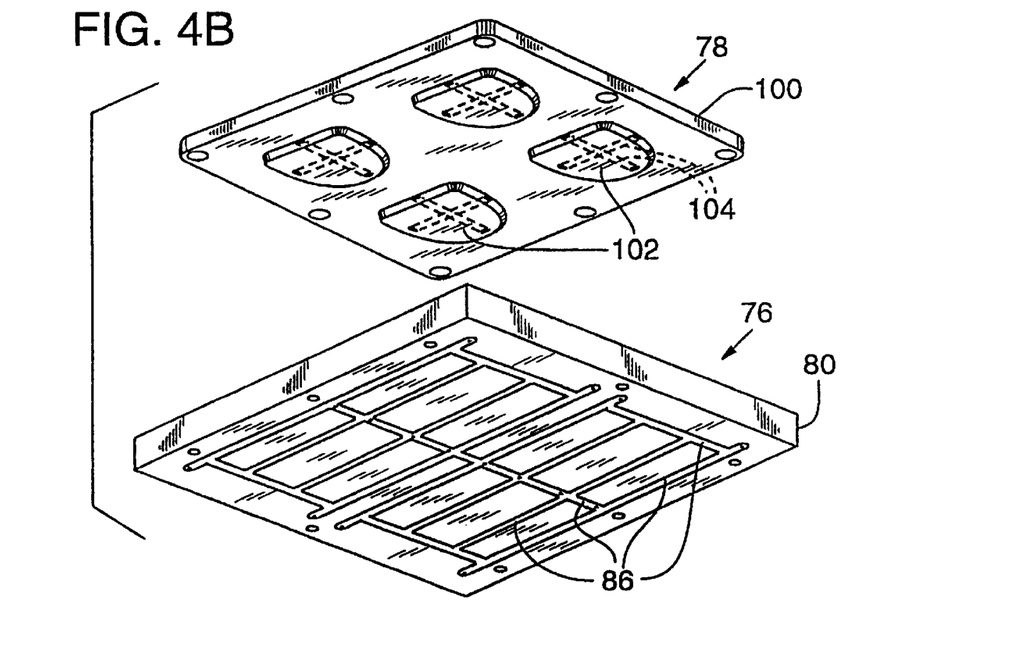
FIG. 4B is an exploded perspective view of the bottom of portions of the thermoforming apparatus of FIG. 4A.
Figure 5A:
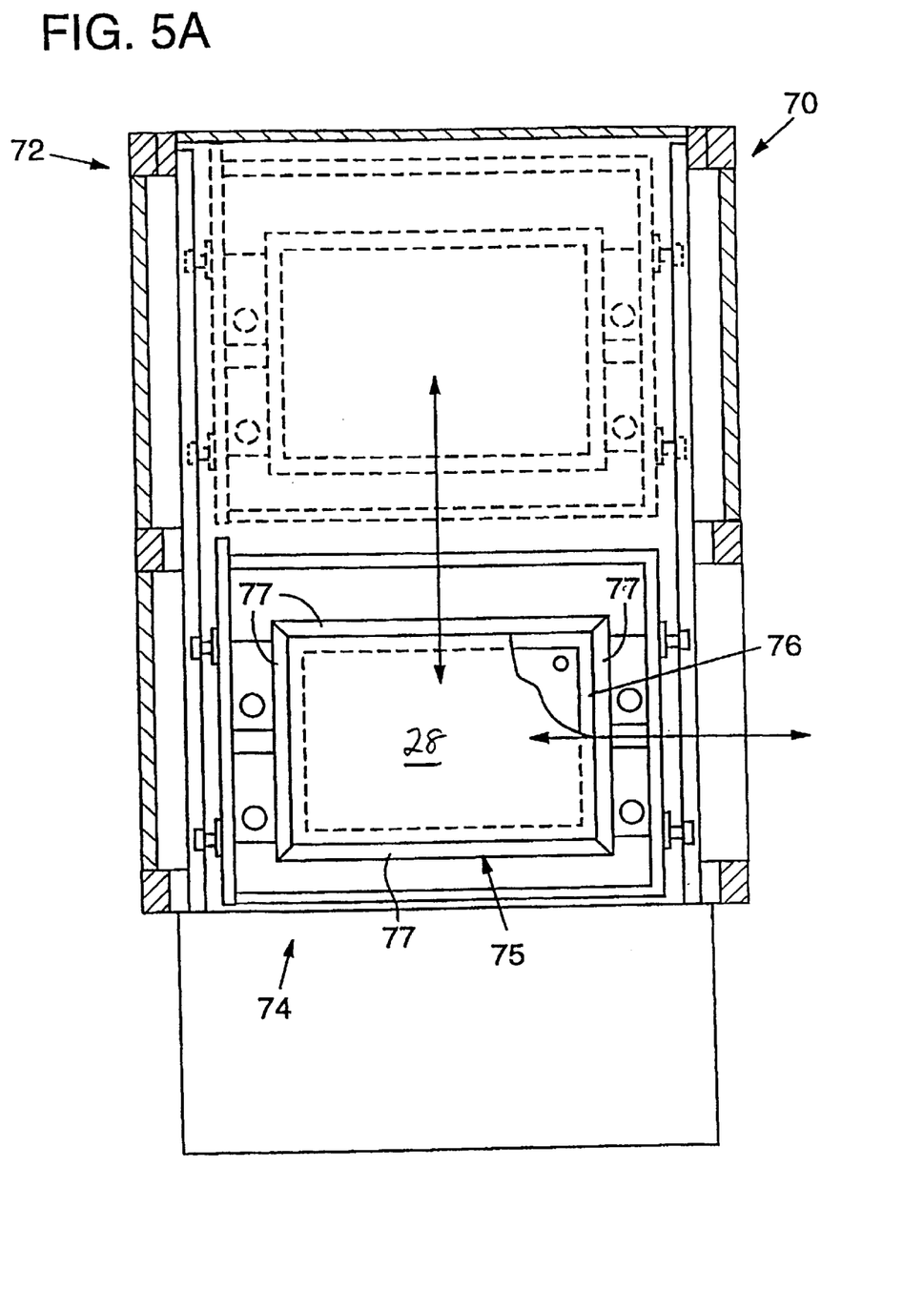
FIG. 5A is a top plan schematic view of the thermoforming apparatus.
Figure 5B:
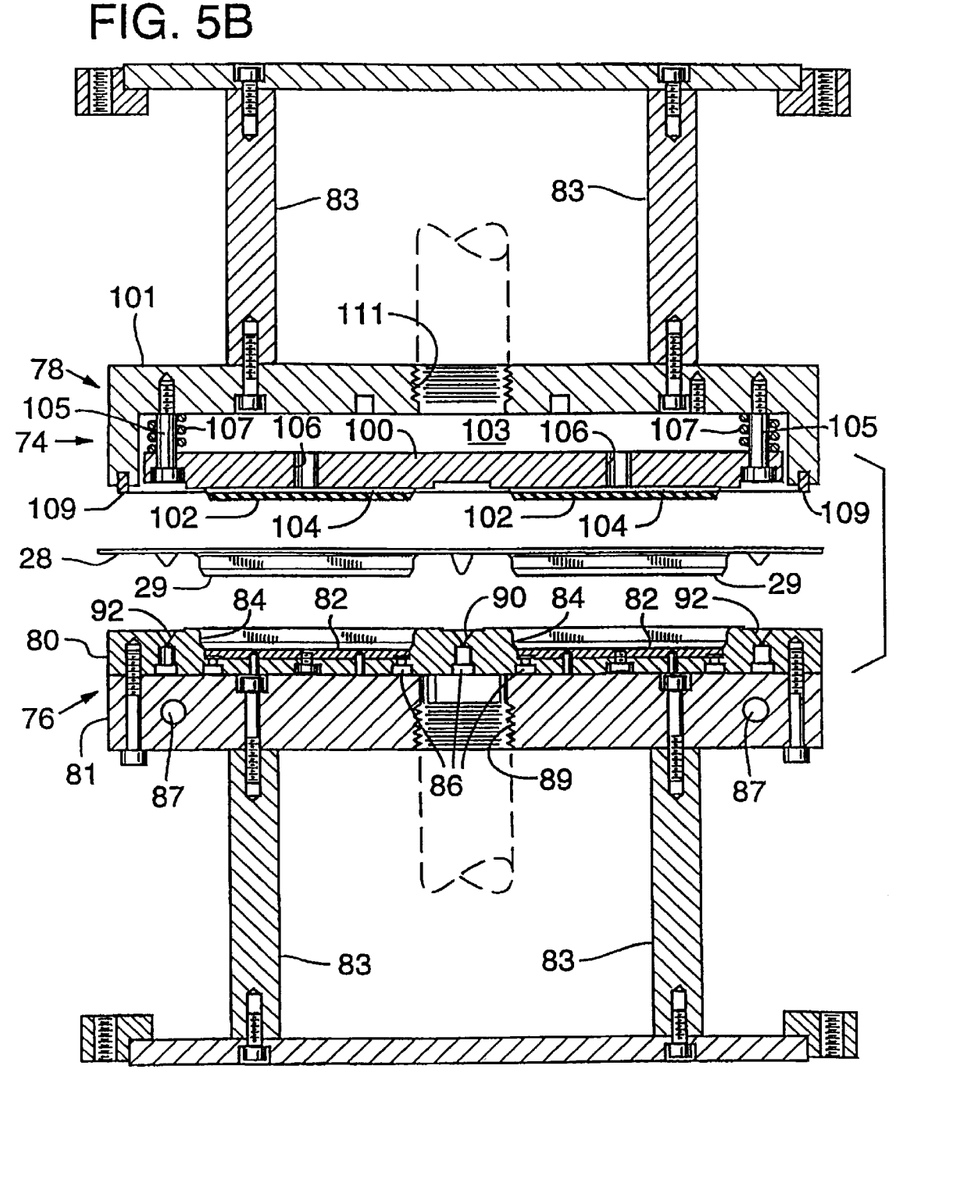
FIG. 5B is a vertical cross-sectional view of the thermoforming apparatus, with portions removed.
Figure 6A:
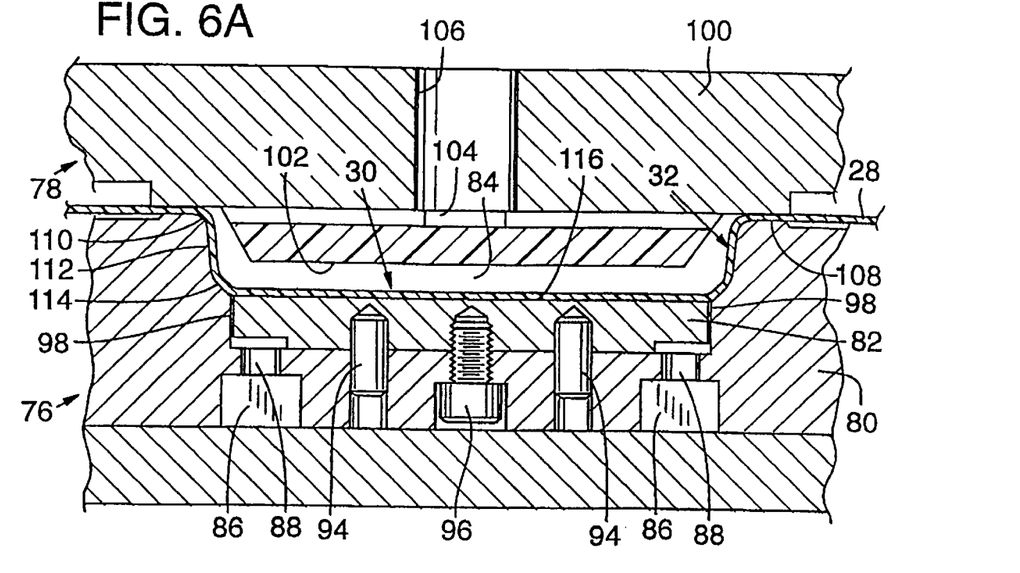
FIG. 6A is a partial cross-sectional view illustrating the forming of a shell from a sheet of plastic material, within the thermoforming apparatus.
Figure 6B:
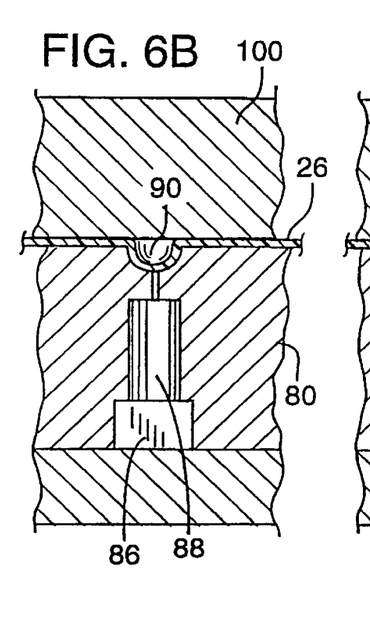
FIGS. 6B and 6C are partial cross-sectional views illustrating the formation of locating indentations in the thermoforming apparatus.
Figure 6C:
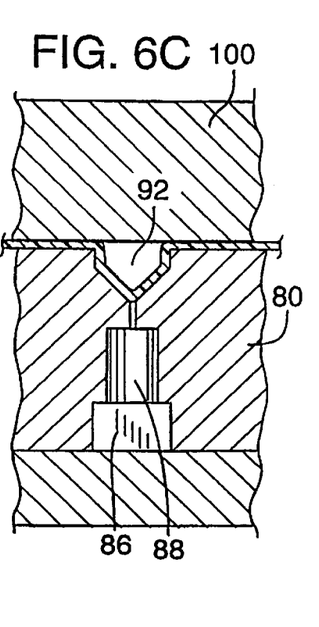
Figure 6D:
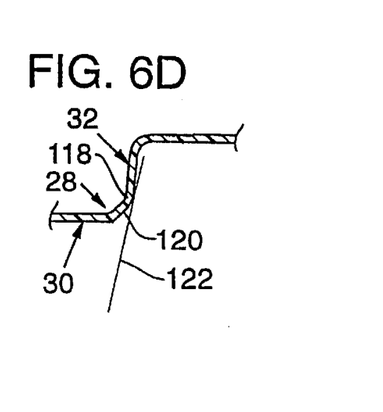
FIG. 6D is a cross-sectional view of an edge portion of a shell formed in accordance with the present invention, illustrating the effect of shrinkage after thermoforming.
Figure 7:
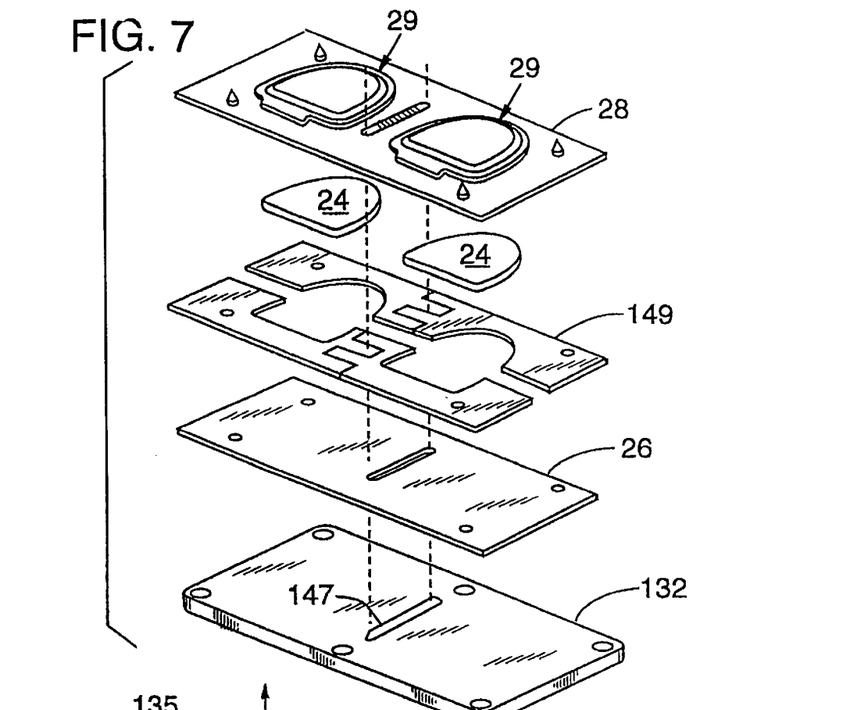
FIG. 7 is a schematic exploded view illustrating a portion of the lamination apparatus used to perform the method of the present invention.
Figure 8:
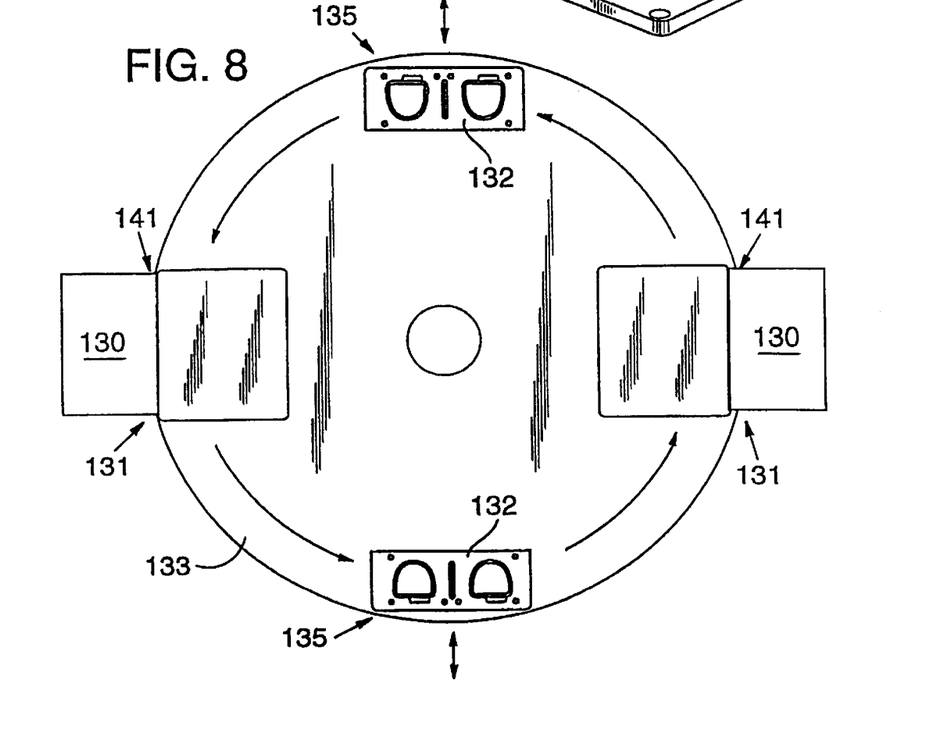
FIG. 8 is a schematic top plan view of the overall lamination apparatus.
Figure 8A:
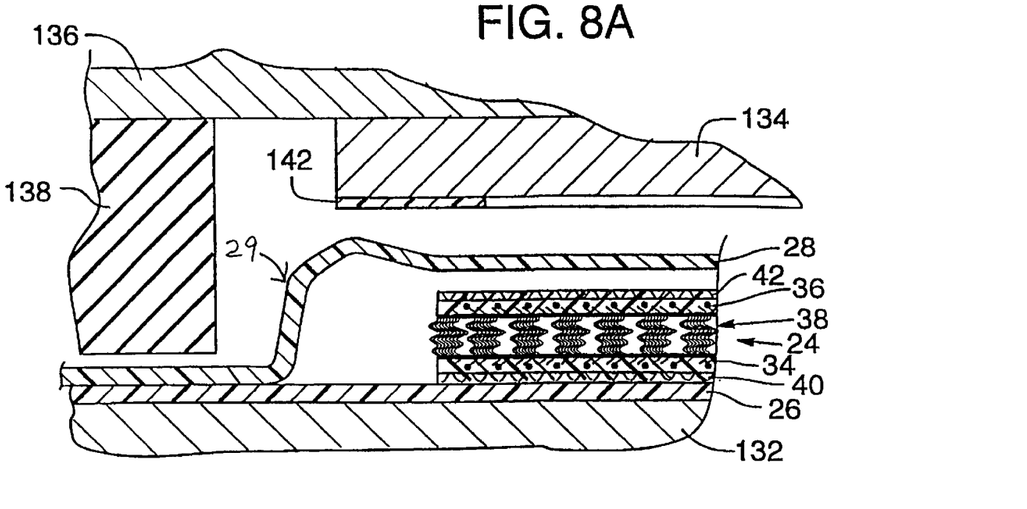
FIGS. 8A, 8B, and 8C are diagrammatic cross-sectional views illustrating steps in the lamination process of the method in accordance with the present invention.
Figure 9:
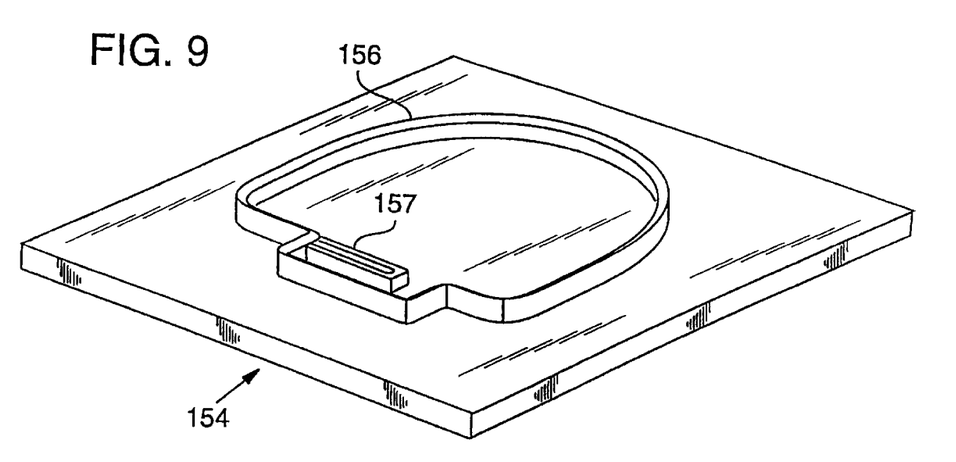
FIG. 9 is a perspective view of a sealing die for use with the method of the present invention.

Referring to FIGS. 4 through 9, a method for manufacturing bladders 20 in accordance with the present invention is illustrated. FIGS. 4, 5, and 6 illustrate the thermoforming step of the process, as well as the apparatus used for thermoforming. FIGS. 7 and 8 illustrate the apparatus and process for laminating or bonding the fabric layers 34 and 36 to the first and second sheets 26 and 28, respectively. FIG. 9 illustrates the apparatus and welding process for forming a seal around the perimeter of bladder 20.

Referring to FIGS. 4 and 5, an apparatus for thermoforming the second sheet of plastic material 28 into shell configuration 29 is illustrated. FIG. 5A schematically illustrates the overall thermoforming apparatus 70, which includes a heater section 72, a thermoforming section 74, and a shuttle frame 75. Thermoforming section 74 includes a lower mold assembly 76 and an upper pressure box 78. Shuttle frame 75 includes an inner frame which extends around the perimeter of mold assembly 76 to define an open area. A clamping bar 77 is associated with each side of the inner frame. Each clamp bar 77 is movable between an open position out of contact with the sides of the inner frame and a closed position in contact with the sides of the inner frame. The sheet 28 of plastic material is placed on top of the inner frame with the clamping bar 77 in an open position. The clamping bars are the moved to their closed position by a conventional pneumatic activating system. In this manner, sheet 28 is held with a major portion of its surface area suspended in the open area defined by shuttle frame 75.

Shuttle frame 75 moves horizontally to carry sheet 28 into heater section 72. Heating section 72 can be any conventional heater capable of heating the thermoplastic material to an appropriate temperature for thermoforming. A typical heater is a quartz-type radiant heater.

A preferred sheet of material is a thermoplastic aromatic polyurethane elastomer based on a poly (butanediol adipate), preferably DOW 2355-85ATP, having a thickness of approximately 0.038" to 0.040". For such a material, an appropriate temperature to which the material should be heated is between 292° F. and 300° F., preferably approximately 300° F. The temperature to which sheet material 28 is heated will depend upon the specific material used. The material should be heated to a degree that exceeds its softening temperature, but is below its melting point; i.e., its glass transition temperature. After the preferred sheet material 28 is heated to approximately 300° F., shuttle frame 75 carries the heated sheet of material out of heater section 72 to the thermoforming section 74.

Shuttle frame 75 positions the sheet of material at a fixed horizontal plane in the area between the lower mold assembly 76 and upper pressure box 78. (In FIG. 5B, shuttle frame 75 has been omitted.) Once the sheet of material is properly positioned, lower mold assembly 76 is raised up to the sheet material, and the upper pressure box 78 is lowered.

FIGS. 4A and 4B are exploded perspective views of operative portions of lower mold assembly 76 and upper pressure box 78; and FIG. 5B is a vertical cross-section of lower mold assembly 76 and upper pressure box 78. A sheet of material 28, after it has been thermoformed, is shown suspended between lower mold assembly 76 and upper pressure box 73, with shuttle frame 75 removed for purposes of simplifying the illustration. As seen in these figures, lower mold assembly 76 includes a base plate 80 attached to a support member 81, which in turn is movably carried on a support frame 83. Conduits 87 are formed in support member 81 to provide communication for a fluid. The fluid preferably heats base plate 80 to approximately 95° F. in order to reduce internal stresses in the material being thermoformed. A plurality of cavities 84 are formed in the top surface of base plate 80 and cavity inserts 82 are each secured in a respective cavity 84. Cavities 84 have a perimeter and side shape into which it is desired to thermoform the sheet of material 28, with the floor or base into which it is desired to thermoform sheet 28 being defined by the top surface of cavity inserts 82. Alternatively, a properly shaped projection can be used in place of cavity 84, and shell configuration 29 can be formed by drawing around the projection.

A plurality of air communication channels 86 are formed in the bottom, reverse side of base plate 80. A plurality of apertures 88 are formed through base plate 80 along channels 86 to provide communication into cavities 84 and indentations 90 and 92 in the top surface of base plate 80, as seen in FIGS. 5B, 6A, 6B, and 6C. A source of both positive and negative pressure is connected to channels 86 through an opening 89 in support member 81. Indentations 90 and 92 function to form positioning indentations in the thermoformed sheet, which serve as positioning devices during further processing. Indentations 90 are a pair of approximately semi-circular elongated channels which extends along the middle of base plate 80, and indentations 92 are a plurality of small circular indentations with pointed bottoms located about the perimeter of base plate 80.

As seen in FIGS. 5B and 6A, cavity insert 82 is secured within a respective cavity 84 by alignment pins 94 extending through apertures in base plate 80 and into apertures within cavity insert 82. A threaded screw 96 threads into a threaded bore in cavity insert 82 to hold cavity insert 82 in position. With cavity insert 82 secured in position, a thin gap 98 is located about the entire perimeter of gap insert 82 and a sidewall of cavity 84. Extending gap 98 around the entire perimeter of the sidewall of cavity 84 assures application of a uniform vacuum around the entire bottom of the mold cavities.

A bottom plate 100 of upper pressure box 78 is illustrated in FIGS. 4 and 6, with other portions of upper pressure box 78 illustrated in FIG. 5B. Upper pressure box 78 also includes a support member 101 which is movably carried by another portion of support frame 83. Bottom plate 100 is movably supported within a cavity 103 in support member 101 by screw fasteners 105. Springs 107, received around fastening screws 105, provide a downward bias on bottom plate 100. A sealing member 109, such as a rubber seal, is carried in a groove around the perimeter of support member 100. A plurality of plugs 102 are secured to the lower surface of bottom plate 100 by an adhesive. Plugs 102 are preferably formed of a syntactic foam material which does not draw away heat. Crossing channels 104 are formed in the top surface of plugs 102, and are in communication with apertures 106 formed through bottom plate 100. Apertures 106 are placed in communication with a positive pressure source through cavity 103 and an opening 111 formed in support member 101.

Because sheet material 28 has been heated to its thermoforming temperature and is supported only along its perimeter edge, sheet 28 sags or bows downward as it is positioned above lower mold assembly 76. In order to prevent sheet 28 from prematurely contacting cavity insert 82 in the bottom of cavity 84, positive pressure, for example at approximately 5 psi, is applied through channels 86 and into cavities 84 through gap 98. Simultaneously with the rising of lower mold assembly 76, upper pressure box 78 is lowered toward lower mold assembly 76 until sealing member 109 contacts a top surface of base plate 80 and forms a seal between base plate 80 and support member 101. As upper pressure box 78 is lowered, plugs 102 push into cavities 84 and preform sheet 28 into an approximate shape of the floor and walls of cavity 84.

A raised coining surface 108 is formed around the outer perimeter of cavity 84 at the top surface of base plate 80. Bottom plate 100 is suspended by screw fastener 105 within upper pressure box 78 so that as it is lowered toward upper pressure box 78 and comes into contact with coining surface 108, springs 107 apply downward pressure in the range of approximately 85 to 90 psi to sheet 28 secured between bottom plate 100 and coining surface 108. By pressing sheet material 28 against coining surface 108, its thickness is reduced slightly and is held uniform during the thermoforming process of sheet 28 within cavity 84. It is important to hold sheet material 28 in a uniform thickness about the perimeter edge of the cavity to aid in the reliability and repeatability of the seam welding process. The coined area of sheet 28 has its thickness reduced, for example, from approximately 0.038" to approximately 0.031". The objective is to have a uniform thickness in this area which is approximately the same as the thickness of the sheet of material 26 forming the covering sheet which is to be welded to the coined area of sheet 28.

With the plug 102 prestretching sheet material 28, and bottom plate 100 pressing the perimeter edge of sheet material 28 against coining surface 108, the slight pressure being applied through gap 98 is turned to a vacuum draw of approximately 27 inches of mercury to pull sheet material 28 against the walls of cavity 84. Simultaneously, pressure of approximately 15 psi is applied into cavity 84 on the opposite side of sheet 28 through apertures 106 and channels 104 in plugs 102. The combination of the vacuum through gap 98 and the positive pressure on the opposite side of sheet 28 assures that sheet 28 accurately forms to the shape of the walls of cavity 84. This vacuum and pressure are applied for approximately 28 seconds for the type of preferred sheet 28 described above. It is important to hold the vacuum and pressure for a sufficient time to ensure that sheet 28 reaches its demolding temperature; i.e., the temperature at which it will hold the shape to which it has been molded.

The surface of cavity 84 has an edge radius or curvature 110 to minimize thinning of the shell while it is being drawn into cavity 84 during the thermoforming process. The surface of cavity 84 also has a draft angle section 112 extending toward the bottom of cavity 84 from edge radius 110. Draft angle section 112 thereafter connects to a bevel section 114 which is formed at a steeper angle than sidewall draft angle section 112, and connects sidewall draft 112 to the floor or base 116 of the forming portion of cavity 84, which is defined by the top surface of cavity insert 82. As discussed above, the material of sheet 28 is preferably a see-through material. To further enhance visibility through side wall 32, draft angle section 118 and bevel section 120 are highly polished.

Lower mold assembly 76 and upper pressure box 78 are moved away from one another, and sheet 28 is removed from lower mold assembly 76 and allowed to cool and shrink. FIG. 6D illustrates the edge of shell 29 defined by sheet 28 after it is thermoformed and has an opportunity to cool and shrink. As seen therein, the shell shape 29 includes floor 30 and sidewall 32. Sidewall 32 includes draft angle section 118 and a bevel section 120. As illustrated diagrammatically in FIG. 6D, draft angle section 118 is angled slightly inward from the line 122, which represents the draft angle section 112 of mold base plate 80. This slight inward bending is caused by the shrinkage of sheet 28 during cooling. If the inward bending exceeds the vertical orientation, it can be referred to as an undercut. The angle of draft angle section 112 is set sufficiently large so that draft angle section 118 of sheet 28 does not bend too severely inward. Such severe inward bending could preclude the proper positioning of the seal die, as will be discussed later.

FIGS. 7, 8, 8A, 8B, and 8C diagrammatically illustrate the apparatus and process for bonding outer fabric layers 34 and 36 to the inner surfaces of first and second sheets 26, 28. The bonding is accomplished by heating the fabric layers 34, 36 and the attached coupling materials 40, 42 with RF energy supplied by an RF generator/press 141. The general common features of heating the fabric layers and coupling materials to accomplish bonding are described in detail in the Rudy '361 patent. Generally, as discussed in the '361 patent, the fabric layers and coupling agent are heated for a controlled time and at a controlled heat input to cause the coupling layer and plastic sheets to melt, and form a bond when cooled. However, the melting is controlled so that the coupling layer does not penetrate through to the inside surface of the outer fabric layers, which would interfere with the free movement of the connecting yarns 38. The following description relates to the novel features of the method of the present invention.

As seen in FIG. 8, RF generator/press 141 is located at a lamination station 131 of a turntable transport device 133. An assembly station 135 is also located along the perimeter of turntable transport device 133. Preferably two lamination stations 131 and two assembly stations 135 are located around turntable transport device 133. The RF generator/press 141 includes an RF energy generator 130, which is coupled to upper and lower portions of a press; base 132, which is supported on turntable transport device 133 forms part of the lower press portion; and a lamination die 134 extending from a moveable die plate 136, and a clamping member 138 form parts of the upper portion of the press. Lamination die 134 follows the perimeter of shell 29 formed in sheet 28. Four of the bases 132 are supported at equidistant positions around the perimeter of turntable transport device 133. Bases 132 preferably include conduits for circulating a liquid at a temperature above 120° F.

FIG. 7 illustrates the manner in which an assembly of first sheet 26, inner double-walled fabric member 24, and thermoformed second sheet 28, are put together for the lamination process. An elongated projection 147 extends up from base 132 along its center. A sheet of plastic material 26 with a hole that mates with elongated projection 147 is placed on top of base 132. As discussed above, sheet material 26 is selected to be of the same material as sheet 28. The thickness of sheet material 26 is selected to be the same as the thickness of the uniform coined region around the perimeter of the shell 29 formed in sheet 28. Matching thickness in this area assures proper heating during the perimeter sealing process. A pair of double-walled fabric inner members 24 is placed on top of sheet 26 and are properly positioned by a two-part center-adjustable template 149. Finally, sheet 28 with the pair of shells 29 thermoformed into it, is placed on base 132, with indentation 90 mating with elongated projection 147. In this manner, inner members 24 are properly aligned within sidewalls 32. Turntable transport device 133 then rotates to move the assembly of base 132, first sheet 26, inner member 24, two-part template 149, and second sheet 28 to lamination station 131.

Figure 8B:
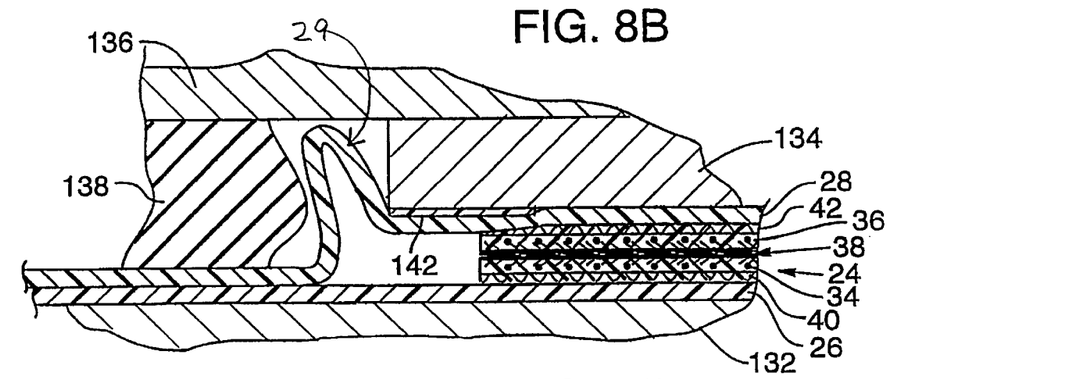
Figure 8C:
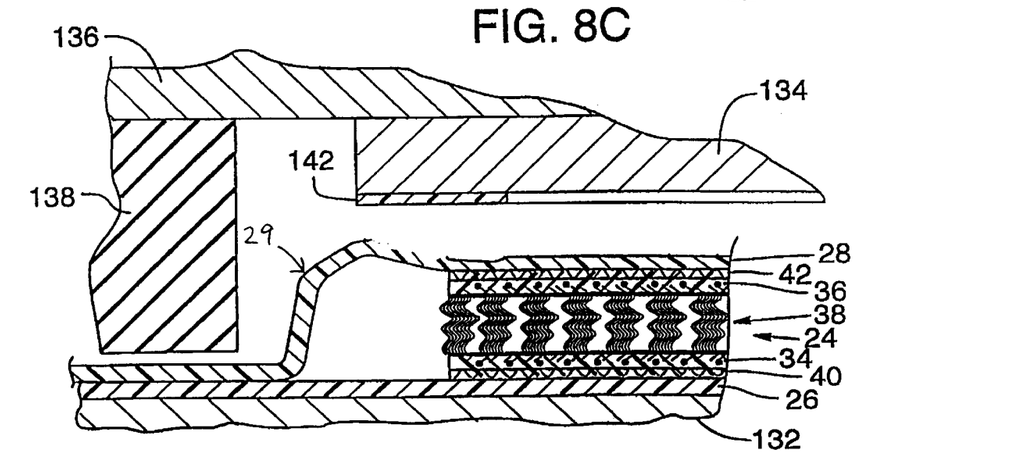

At lamination station 131, lamination die 134, together with moveable die plate 136 and clamping member 138, are lowered toward base 132 and compress the assembly of sheets 26, 28 and double-walled fabric inner member 24, as shown in FIG. 8B. A stop (not shown) stops the movement of lamination die 134 at a predetermined point so that a predetermined spacing between the major surfaces of sheets 26 and 28 is attained and a set amount of compression of inner member 24 occurs. The stop is set so that the fabric layers 34 and 36 almost touch. This compression causes the outer sheets 26 and 28 to press against base 132 and lamination die 134. A strip 142 of a thermally insulating material such as teflon impregnated fiberglass is placed around the perimeter of lamination die 134 and is configured to extend over the perimeter of double-walled fabric inner member 24. Since the perimeter area of inner member 24 is the most difficult area to laminate, strip 142 is used to hold the thermal energy along the perimeter of inner member 24, by preventing lamination die 134 from functioning as a heat sink in that area.

As inner member 24 is compressed, clamping member 138, which is preferably formed of a closed cell neoprene material comes into contact with the rim of sheet 28 which extends outside of the sidewall 32. Clamping member 138 ensures that the rim surrounding the sidewall remains in position with respect to sheet 26 so that as inner member 24 is compressed, sidewall 32 rolls in on itself, as illustrated in FIG. 8B. Clamping member 138 can be formed of separate segments located around the perimeter of shell 29, or can be formed as a continuous strip around the perimeter of shell 29. If this rolling in action does not occur and sidewall 32 is merely allowed to fold downward or slide outward, sidewall 32 may weld to sheet 26 or to itself, thereby forming an improperly configured part.

Additional design and process factors must be taken into consideration to ensure that the proper rolling in action of sidewall 32 occurs. For example, during the thermoforming of sheet 28, the draft angle section 118, which is formed in sidewall 32, must be sufficiently shallow (not too great an angle) so that during compression the rolling in action occurs, rather than simply flattening or compressing the sidewall down toward sheet 26. It has been found that a draft angle between approximately 5° and 10° works for a formed part depth (the distance from the inner surface of floor 30 to coined area around the rim of shell 29) up to ⅜ of an inch. As mentioned above, the draft angle also should be large enough to ensure that after the sidewall bends inward because of shrinkage, the sidewall 32 does not bend in so far that, during the hereinafter discussed sealing step, the sealing die cannot be properly located. Again, the 5° to 10° angle has been found to be appropriate.

Another factor to ensure the proper rolling in action is the location of the perimeter edge of the lamination die 134. A balance must be struck between extending the lamination die 134 outward of the perimeter edge of inner member 24 a sufficient amount to ensure complete bonding along the perimeter edge of inner member 24, while at the same time locating the inner edge of lamination die 134 sufficiently inward of the outer edge of sidewall 32 to prevent the lamination die 134 from buckling sidewall 32 against itself or against sheet 26.

With shell 29 and inner member 24 in the compressed state illustrated in FIG. 8B, radio frequency energy is applied by the RF generator 130. For the typical sheets 26 and 28 and inner member 24, referred to above, RF energy is applied for approximately three seconds with sufficient power to form the required bond. As with base 132, liquid at a temperature of approximately 120° F. is circulated through lamination die 134. The liquid circulation is used to maintain a relatively constant surface temperature on base 132 and lamination die 134 during the lamination of successive parts. By elevating the temperature of the base and die to 120° F. prior to applying RF energy, the time the energy needs to be supplied is shortened. After the RF energy is shut off, the liquid functions to cool the base, die, and laminated part. The liquid also prevents the base and die from heating up significantly above the 120° F. point after successive lamination cycles.

After the RF energy is turned off, lamination die 134 remains pressed against base 132 for approximately an additional three and a half seconds to allow the part to cool. Lamination die 134 is then moved upward to the position shown in FIG. 8C, and the bands of connecting yarns 38 expand back to approximately their original position by the unrolling action of sheet 28. A slight indentation is formed around the perimeter of sheet 26 in the area of insulating strip 142 shown in FIG. 8C.

Sheet 28 is now bonded to fabric layer 34 and sheet 26 is bonded to fabric layer 36. Turntable transport device 133 rotates to carry the bonded parts to an assembly station 135. The bonded parts are removed from base 132 and taken to a welding apparatus 150 for sealing.

Figure 9A:
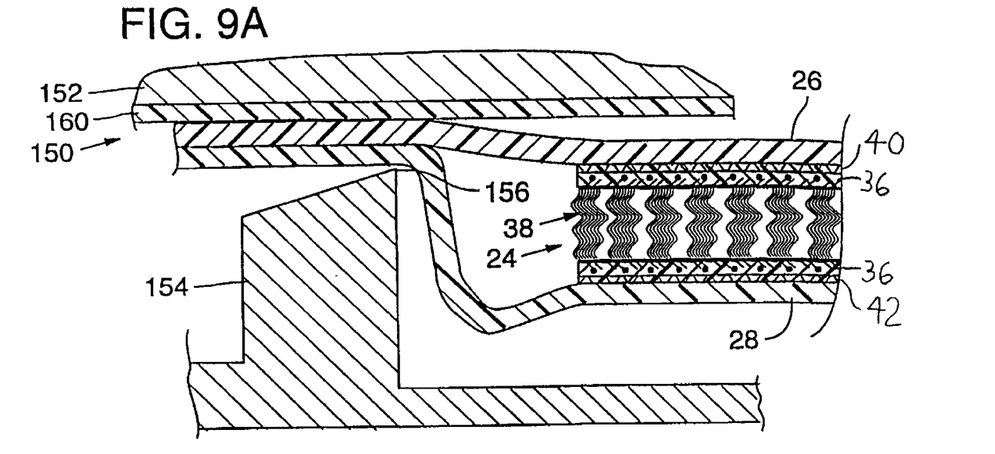
FIGS. 9A and 9B are diagrammatic cross-sectional views illustrating the edge seam welding process of the method in accordance with the present invention.
Figure 9B:
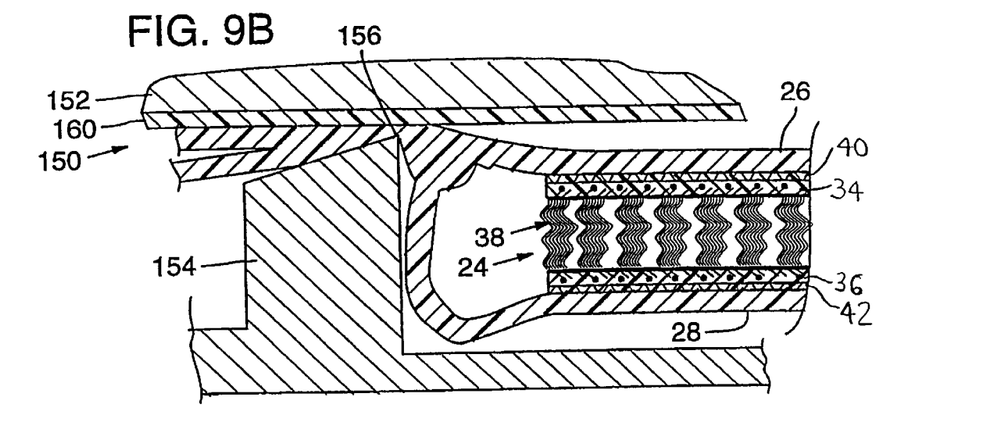
Figure 9C:
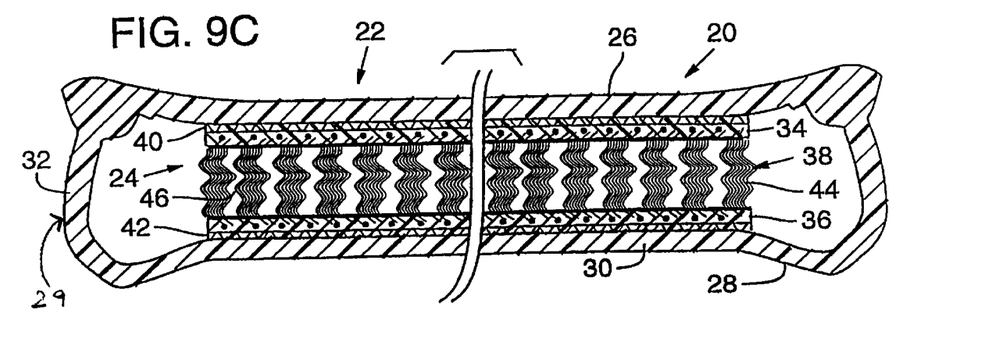
FIG. 9c is a diagrammatic cross-sectional view of a bladder in accordance with the present invention, prior to inflation with a pressurized fluid.
Figure 9D:
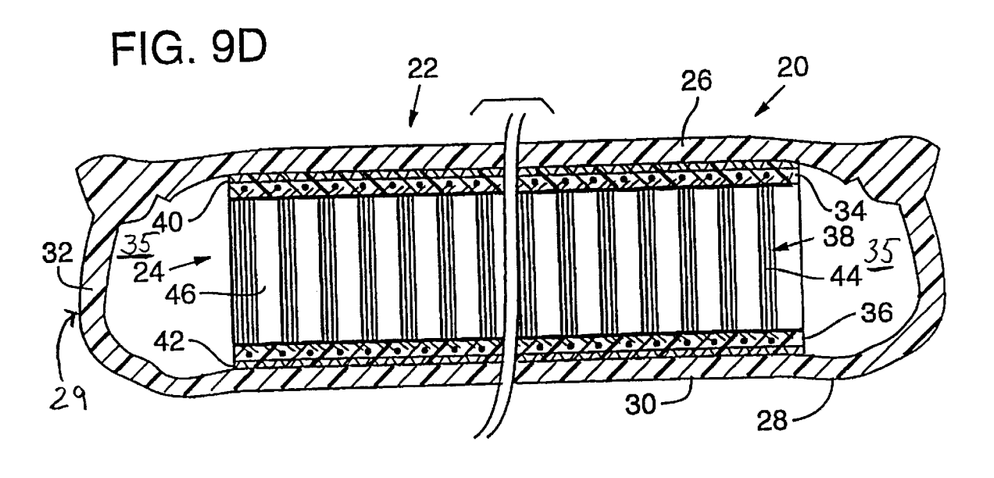
FIG. 9D is a diagrammatic cross-sectional view of the bladder of FIG. 9C after inflation with a pressurized fluid.

FIG. 9 illustrates a welding die 154; and FIGS. 9A and 9B schematically illustrate the welding apparatus 150 and method in accordance with the present invention wherein a perimeter tear-type seal is formed around the perimeter of bladder 20. Welding apparatus 150 includes a top platen 152 and the welding or sealing die 154. Conventional RF welding components are used to move sealing die 154 and to apply RF energy. However, the configuration of the sealing die 154, the stepped manner in which RF energy and pressure are applied, and the bladder with a tear seal formed intermediate the sealing bead are all aspects of the present invention.

Sealing die 154 has an angled sealing edge or tip 156 extending around its perimeter. The angled edge 156 slopes downwardly at an angle between approximately 20° to 25°, preferably approximately 23° away from the plane parallel to the rim of sheet 28 and the plane of sheet 26. The angled edge 156 allows for melting or beading of the thermoplastic sheet material on either side of the edge 156, as illustrated in FIG. 9B. Sealing die 154 also includes a flat sealing edge 157, which is located at a level below that of the tip of angled edge 156. Sealing die 154 forms the lower die surface, and the laminate assembly of sheets 26 and 28 and inner member 24 is placed inside the perimeter defined by angled edge 156. Preferably a pair of sealing dies 154 are used in a side-by-side relationship to accommodate a pair of parts formed in the lamination process. Pointed indentations 92 are used to position sheets 26, 28 with respect to dies 154 by placement over appropriately located projections. The depth of the cavity bordered by angled edge 156 is such that sheet 28 remains out of contact with the bottom of the cavity when the assembly is suspended on angled edge 156.

The seal is formed around the perimeter of bladder 20 by moving welding die 154 upward against top platen 152 and pressing beveled edge 156 into layers 28 and 26, while applying RF energy. A buffer material 160 is placed between the bottom surface of top platen 152 and angled edge 156. Buffer material 160 is preferably a NEMA standard G7 dielectric material, such as a silicone fiber based material. Buffer material 160 serves as a thermal and pressure buffer against which angled edge 156 presses. As seen in FIG. 9, sealing die 154 also includes a flat sealing section 157, which is at a level below that of beveled edge 156. Sealing section 157 forms a seal in bladder 20 within the tear seal line formed by edge 156.

While welding die 154 presses against sheets 28 and 26, RF energy is simultaneously applied. Both the pressure and RF energy of welding die 154 are applied in a stepped manner. For example, when sheets 28 and 26 are made of a polyurethane material as described above, with a total thickness of approximately 0.060", and the RF area of the dies is in the range of one to five square inches for a pair of bladders 20 that are being sealed simultaneously, the pressure and energy are applied in the following manner: the pressure steps from 3 bars to 6 bars to 8 bars to 10 bars, at approximately two-second intervals; and RF energy is increased by stepping the RF generator plate current of the from an initial setting of 0.5 amp to 1.1 amp after three seconds of operation, and keeping the plate current at the 1.1 amp setting for approximately six seconds. Typically, the DC voltage is in the range of one- to twenty-thousand volts.

The amount of pressure that is applied by the angled edge 156 is limited to a compression into the sheets 28 and 26 of a predetermined amount. This is accomplished by utilizing a stop which prevents angled edge 156 from penetrating completely through sheets 28 and 26. For example, if the combined thickness of the sheets is approximately 0.060", the stop would prevent angled tip 156 from penetrating deeper than approximately 0.0575". Utilizing this sealing technique, in addition to a bead forming on either side of angled edge 156, a line of thinned out material is formed in the area of contact with the angled edge 156. It is preferred that the thinned out area have a thickness approximately 0.0025" or less. In this manner, bladder 20 remains connected to the remainder of sheets 28 and 26, yet can be easily manually torn out along the thinned out area, which functions as a tear seal. Flat sealing edge 157 forms a solid bead seal without a thinned out area. The sealed area formed by sealing edge 157 is used as an inflation area for bladder 20.

After the formation of the tear seal, bladders 20 are carried in sheets 26 and 28, moved away from welding apparatus 150, and removed from welding die 154. The individual bladders 20 are removed from the remainder of sheets 26 and 28 and thereafter inflated in a conventional manner, as described in the '345 patent. That is, a hollow needle is used to puncture bladder 20, in the sealed area formed by flat sealing edge 157, and pressurized air at approximately 60 to 80 psi is supplied through the needle to pre-inflate the bladder. The pressurized air is expired from the bladder and the intended permanent inflation gas is inserted at the desired pressure, for example from 5 to 30 psi, typically 20 psi. The needle is then withdrawn and the puncture hole is sealed. The sealed inflation area can be trimmed off after an additional seal is formed at the trimmed area. The pressurized and sealed bladders 20 can now be incorporated into soles of footwear in a conventional manner.

Numerous characteristics and advantages of the invention have been described in detail in the foregoing description with reference to the accompanying drawings. However, the disclosure is illustrative only and the invention is not limited to the precise illustrated embodiment. Various changes and modifications may be effected therein by persons skilled in the art without departing from the scope or spirit of the invention.

What is claimed is:

1. A bladder for use as a cushioning element in footwear comprising:

a sealed chamber formed of a plastic material, said chamber having spaced apart first and second major surfaces and a configuration shaped to fit within a sole of footwear;

a double walled fabric material received inside of said sealed chamber, said fabric material having spaced apart first and second fabric layers and a plurality of connecting yarns connected between said fabric layers, said connecting yarns being formed in discrete bands, with each band containing a plurality of said connecting yarns and gaps defining void areas devoid of connecting yarns being located between adjacent bands to enhance the compressibility of said fabric material, said first and second fabric layers respectively being attached to said first and second major surfaces of said sealed chamber; and said sealed chamber containing a fluid to place said plurality of connecting yarns under tension.

2. The bladder of claim 1 wherein said fabric is a double needle bar Raschel knit fabric with said gaps formed by omitting predetermined needles in the knitting process.

3. The bladder of claim 1 wherein said plastic material of said chamber is formed of a pair of first and second plastic sheets sealed together around the perimeter of said sealed chamber.

4. The bladder of claim 3 wherein said first plastic sheet is formed into the shape of a shell with a floor and a sidewall extending away from said shell to a perimeter edge, and said second plastic sheet is formed substantially flat and is sealed to perimeter edge of said first plastic sheet.

5. The bladder of claim 3 wherein the bladder is shaped to form a portion of a sole of footwear and at least a portion of said sidewall is formed of see-through material and is configured to be located along a visible edge of the sole.

6. The bladder of claim 1 wherein said fluid is a gas.

7. The bladder of claim 6 wherein said gas is contained in said sealed chamber at a pressure above atmosphere.

8. An article of footwear comprising:

an upper for receiving the foot of a wearer; and a sole attached to said upper, at least a portion of said sole including a cushioning bladder comprising:

a sealed chamber formed of a plastic material, said chamber having spaced apart first and second major surfaces;

a double walled fabric material received inside of said sealed chamber, said fabric material having spaced apart first and second fabric layers and a plurality of connecting yarns connected between said fabric layers, said connecting yarns being formed in discrete bands, with each band containing a plurality of said connecting yarns and gaps defining void areas devoid of connecting yarns being located between adjacent bands to enhance the compressibility of said fabric material, said first and second fabric layers respectively being attached to said first and second major surfaces of said sealed chamber; and said sealed chamber containing a fluid to place said plurality of connecting yarns under tension.

9. The article of footwear of claim 8 wherein said fabric is a double needle bar Raschel knit fabric with said gaps formed by omitting predetermined needles in the knitting process.

10. The article of footwear of claim 8 wherein said plastic material of said chamber is formed of a pair of first and second plastic sheets sealed together around the perimeter of said sealed chamber.

11. The article of footwear of claim 10 wherein said first plastic sheet is formed into the shape of a shell with a floor and a sidewall extending away from said shell to a perimeter edge, and said second plastic sheet is formed substantially flat and is sealed to perimeter edge of said first plastic sheet.

12. The article of footwear of claim 11 wherein at least a portion of said sidewall is formed of see-through material and is configured to be located along a visible area of the sole.

13. The article of footwear of claim 8 wherein said fluid is a gas.

14. The article of footwear of claim 13 wherein said gas is contained in said sealed chamber at a pressure above atmosphere.

* * * * *